United States Patent [19]

Smith et al.

[11] 4,056,006
[45] Nov. 1, 1977

[54] METAL DITHIOCARBAMATE COMPOSITION FOR FORMING THERMOPARTICULATING COATING

[75] Inventors: James D. B. Smith, Turtle Creek; Joseph F. Meier, Export; David C. Phillips, Pittsburgh, all of Pa.

[73] Assignee: Westinghouse Electric Corporation, Pittsburgh, Pa.

[21] Appl. No.: 634,217

[22] Filed: Nov. 21, 1975

[51] Int. Cl.$^2$ .................. G01K 11/02; C09K 3/00
[52] U.S. Cl. .................................. 73/339 R; 252/408
[58] Field of Search ............ 73/339 R, 349; 310/52, 310/55, 56; 252/4.08

[56] References Cited

U.S. PATENT DOCUMENTS

| | | | |
|---|---|---|---|
| 3,427,880 | 2/1969 | Grobel et al. | 73/339 |
| 3,807,218 | 4/1974 | Carson et al. | 73/28 |
| 3,994,840 | 11/1976 | Kajimura et al. | 260/2.5 B |

OTHER PUBLICATIONS

Vanderbilt Rubber Handbook (11th Ed.), R. J. Vanderbilt Co., New York, 1968, pp. 565–568.
Thorn, G. D. and R. A. Ludwig; *The Dithiocarbamates and Related Compounds*, Elsevier Pub. Co., N.Y., 1962.

*Primary Examiner*—Jerry W. Myracle
*Assistant Examiner*—John S. Appleman
*Attorney, Agent, or Firm*—R. D. Fuerle

[57] ABSTRACT

A composition is disclosed of a metal dithiocarbamate, a resinous carrier, and a solvent. The composition is applied to a portion of an electrical apparatus which is exposed to a gas stream. The solvent in the composition is evaporated to produce a thermoparticulating coating. When the electrical apparatus overheats the metal dithiocarbamate in the coating forms particles in the gas stream which are detected by the monitor.

20 Claims, No Drawings

METAL DITHIOCARBAMATE COMPOSITION FOR FORMING THERMOPARTICULATING COATING

CROSS-REFERENCE TO RELATED APPLICATIONS

This application is related to application Ser. No. 426,391, filed Dec. 19, 1973, by Emil M. Fort, Thomas D. Kaczmarek, and David Colin Phillips, entitled "Sampling System for Power Generators," now U.S. Pat. No. 3,972,225.

This application is also related to application Ser. No. 568,222, filed Apr. 15, 1975, by J. D. B. Smith, J. F. Meier, and D. C. Phillips, entitled "Blocking Isocyanate Composition for Forming Thermoparticulating Coating."

This application is related to application Ser. No. 568,219, filed Apr. 15, 1975, by J. D. B. Smith and D. C. Phillips, entitled "Malonic Acid Derivative Composition For Forming Thermoparticulating Coating," now U.S. Pat. No. 3,995,489.

This application is related to application Ser. No. 568,224, filed Apr. 15, 1975, by J. D. B. Smith and D. C. Phillips, entitled "Diazonium Salt Composition For Forming Thermoparticulating Coating," now U.S. Pat. No. 3,979,353.

This application is related to application Ser. No. 390,284, filed Aug. 21, 1973 by J. D. B. Smith et al., entitled "Composition For Forming Thermoparticulating Coating Which Protects Electrical Apparatus," now U.S. Pat. No. 3,973,438.

This application is related to application Ser. No. 568,221, filed Apr. 15, 1975, by J. D. B. Smith et al., entitled "Metal Acetyl Acetonate Composition For Forming Thermoparticulating Coating," now U.S. Pat. No. 3,973,439.

This application is related to application Ser. No. 568,223, filed Apr. 15, 1975, by J. D. B. Smith, D. C. Phillips, and K. W. Grossett, entitled "Grease Thermoparticulating Coating," now U.S. Pat. No. 3,955,417.

This application is related to application Ser. No. 568,218, filed Apr. 15, 1975, by D. C. Phillips, W. M. Hickam, and J. D. B. Smith, entitled "Multiple Signal Thermoparticulating Coating."

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues, the entire machine may be damaged.

Large rotating electrical apparatus is usually cooled with a hydrogen gas stream. The organic compounds in the apparatus are first to be affected by the overheating and they decompose to form particles which enter the gas stream. Monitors then detect particles in the gas stream and sound a warning or shut down the apparatus when too many particles are detected.

Descriptions of such monitors and how they function may be found in U.S. Pat. No. 3,427,880 entitled "Overheating Detector for Gas Cooled Electrical Machine" and in U.S. Pat. No. 3,573,460 entitled "Ion Chamber for Submicron Particles." Another monitor, "The Condensation Nuclei Detector," is described by F. W. Van-Luik, Jr. and R. E. Rippere in an article entitled "Condensation Nuclei, A New Technique For Gas Analysis," in Analytical Chemistry 34,1617 (1962) and by G. F. Skala, in an article entitled "A New Instrument For The Continuous Detection Of Condensation Nuclei," in Analytical Chemistry 35, 702 (1963).

As U.S. Pat. Nos. 3,427,880 and 3,807,218 suggest, special coatings may be applied to the apparatus which decompose and form detectable particles at a lower temperature than the usual organic compounds found in the apparatus. For example, those patents mention polyalphamethylstyrene, polystyrene, polymethyl methacrylate, and cellulose propionate which decompose to form particles at 230° to 340° C. Unfortunately, since these machines normally operate at about 50° to 100° C, they may be severely damaged by the time the temperature reaches 230° to 340° C.

Efforts to identify materials which will decompose to form detectable particles (i.e., thermoparticulate) at temperatures closer to the operating temperature of the machine have met with several difficulties. Many compounds, such as succinic acid, maleic acid, fumaric acid, and polyacrylic acid, do not decompose below 190° C. Others such as acetic acid, are liquids which boil and therefore are unsuitable. Some compounds, such as oxalic acid, decompose at a low temperature but the decomposition products do not include detectable particles. Compounds such as 1,2-diformylhydrazine have some of the desirable properties but cannot withstand several years operation at 50° to 100° C. A few compounds contain toxic or corrosive substances in their decomposition products which may render them unsuitable.

SUMMARY OF THE INVENTION

We have found that metal dithiocarbamates can be used in a composition to form a thermoparticulating coating. The coating can be made compatible with the other organic compounds in the apparatus. The coating is very stable and can withstand several years operation at 60° or 80° C (depending on the particular metal dithiocarbamate used) without decomposing, yet still produce detectable particles when the temperature reaches about 157° to 196° C (depending on the particular metal dithiocarbamate used). Also, when the coating is heated to about the thermoparticulating temperature of the coating it blisters and becomes a very dark brown or black color which is a considerable aid in locating the malfunction.

We have also found that the thermoparticulation products of metal dithiocarbamates give a very distinctive "fingerprint" in a mass spectrometer because they are the only thermoparticulating compounds we have yet discovered which give off carbon disulfide when they thermoparticulate. This is very useful because it can pinpoint the exact area in the generator that is being overheated, which is very helpful in repairing the defect.

DESCRIPTION OF THE INVENTION

A composition is prepared of a metal dithiocarbamate in a solution of a resinous carrier. The metal dithiocarbamate may be dispersed if it is insoluble in the solvent (e.g., toluene) or it may be in solution if it is soluble in the solvent (e.g., ethyl alcohol or diethyl ether). Dispersions are preferred as they produce much more particulation than do solutions. A particle size of the dispersed metal dithiocarbamate of about 25 to about 1000 microns is suitable.

The composition may be prepared by simply mixing the ingredients, but it is preferable to mix the drier, resinous carrier, and solvent first and then add the metal dithiocarbamate to prevent the occlusion of the drier in the metal dithiocarbamate and thereby obtain a more homogeneous dispersion of the metal dithiocarbamate.

A suitable composition is a resinous carrier, about 2 to about 250 phr (parts by weight per hundred parts of resinous carrier) of metal dithiocarbamate, and about 25 to about 75% (by weight based on the resinous carrier) of a solvent for the resinous carrier. If the amount of metal dithiocarbamate is less than about 20 phr, the quantity of particles given of during decomposition may be too low to be detected by presently-existing detectors. However, the construction of more sensitive detectors would permit a lower amount of metal dithiocarbamate. If the amount of metal dithiocarbamate exceeds about 250 phr, the composition is thick, difficult to apply, and does not bond well. The preferred amount of metal dithiocarbamate, which generally gives the best results, is about 40 to about 60 phr. If the amount of solvent is less than about 25%, the composition is generally too viscous to apply easily and if the amount of solvent is greater than about 75%, the composition is unnecessarily dilute and the coating may be too thin to produce an adequate number of particles during decomposition, at least while the malfunction is highly localized. Best results are usually obtained with about 45 to about 55% solvent.

The composition also preferably contains about 0.1 to about 3 phr of a drier when the resinous carrier is an epoxy resin or similar resin, to promote its room temperature cure. Lead naphthenate or cobalt naphthenate is preferred although stannous octoate, zinc stearate, etc. could also be used. Resins such as polyesters may also require the presence of an organic peroxide as is known in the art. Mixtures of various resins, solvents, or driers are also contemplated.

The thermoparticulating compounds of this invention are metal dithiocarbamates. The metal dithiocarbamate must decompose between about 60° and about 200° C and produce particles larger than about 25A in order for the particles to be detected with presently-existing monitors. Specifically, suitable metal dithiocarbamates have the general formula

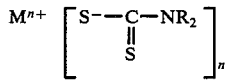

where each R is independently selected from hydrogen, alkyl to $C_{20}$, cycloalkyl to $C_{20}$, arylalkyl to $C_{20}$, aryl, and heterocyclic. Preferably each R is alkyl from $C_1$ to $C_5$ as these compounds are easier to synthesize. The M element in the formula may be any metal cation but is preferably Group II or Group VI metal ion, particularly Cd, Te, Se, or Zn as they have lower thermoparticulating temperatures. Particularly preferred are Cd and Zn because those compounds are stable at higher temperatures. The "n" in the formula is the number of charges on the M ion and the number of dithiocarbamate ions.

Examples of suitable metal dithiocarbamates include cadmium diethyl dithiocarbamate, tellurium diethyl dithiocarbamate, copper dithiocarbamate, zinc diethyldithiocarbamate, bismuth diethyldithiocarbamate, selenium diethyldithiocarbamate, zinc dibutyldithiocarbamate, zinc dimethyldithiocarbamate, and lead dimethyldithiocarbamate. Examples of other metal dithiocarbamates which have not been tried but are expected to work are cadmium dihydrogendithiocarbamate, selenium methylphenyldithiocarbamate, and zinc hydrogenbenzyldithiocarbamate.

The resinous carrier performs the function of bonding the metal dithiocarbamate to the apparatus since a coating of dithiocarbamate by itself does not adhere well. The resinous carrier should be compatible with the other resins used in the apparatus and therefore it is usually advantageous to use the same resin used elsewhere. The resinous carrier is curable at 60° C and is preferably air-dryable since it cannot be easily cured in place with heat. Also, it should be stable after curing for several years at 60° C. The resin must be unreactive with the metal dithiocarbamate for otherwise suitable thermoparticulation will not occur. The metal dithiocarbamate and the resin form a mixture and the metal dithiocarbamate does not catalyze the cure of the resin. Epoxy resins are preferred as they are usually used elsewhere in the apparatus, but polyesters, silicone rubber, polystyrene, etc. could also be used.

The solvent for the resinous carrier depends on the particular resinous carrier used. Toluene, xylene, benzene, methyl ethyl ketone, ethyl alcohol, diethyl ether, acetone, cellosolve, etc. are common solvents that may be used. Toluene is preferred as it is inexpensive and dissolves most resins.

The composition is applied to portions of the electrical apparatus which are exposed to the gas stream. The coating does not function as insulation and is usually applied on top of insulation, but it can also be applied to conductors. The application may be made by brushing, spraying, dipping, grease gun, troweling, or other techniques. A suitable coating thickness (after drying) is about 1/16 to about ½ inch. The dispersed particles of metal dithiocarbamate should not be covered with excessive resinous carrier as that may prevent the decomposition particles from escaping into the gas stream. After evaporation of the solvent and room temperature cure of the resinous carrier, if necessary, the apparatus is ready to be operated. When thermoparticulation and the resulting alarm occur, a sample of the gas stream can be collected and analyzed. Since different metal dithiocarbamates and other thermoparticulating compounds can be used in different areas of the apparatus and their thermoparticulation products are different, analysis of the sample can pinpoint the location of the overheating.

The compositions of this invention are useful in areas of generators which are not subject to temperatures much in excess of 60° or 80° C (depending on the particular metal dithiocarbamate used). Such areas include the outside surface of the stator windings at the exciter end of a 2-pole, gas-cooled machine with radial gas flow (i.e., at the "cool" end), the outside surface of the stator windings at the exciter end of a water-cooled, 4-pole machine with axial core ventilation, and on the cool end of the stator coil of a 4-pole, gas-cooled machine with axial core ventilation.

The following examples further illustrate this invention.

EXAMPLE 1

The following composition was prepared using various metal dithiocarbamates:

| | Parts by Weight |
|---|---|
| Metal dithiocarbamate | 100 |
| Epoxy resin, 50% solids in toluene, made from 200 pbw (parts by weight) linseed fatty acids, 200 pbw styrene, and 300 pbw diglycidyl ether of Bisphenol A, sold by Westinghouse Electric Corporation as "B-276" Varnish (See Example I of U.S. Patent 2,909,497 for detailed description) | 100 |
| 6% solution in low boiling hydrocarbons of cobalt naphthenate | 1.0 |
| 24% solution in low boiling hydrocarbons of lead naphthenate | 0.25 |

The cobalt and lead naphthenate solutions were added to the epoxy resin prior to the addition of the metal dithiocarbamate.

Samples were prepared by brushing the above composition onto 3 inch by 1 inch aluminum sheets 1/16 to ¼ inches thick. The samples were dried overnight at 60° C to form coatings ¼ inches thick, then placed in a forced-air oven at 60° or 80° C for various periods to determine if they were stable and would function after aging.

The samples were placed one at a time in a stainless steel boat within a 1 inch o.d. stainless steel tube. Hydrogen was passed over the samples at flow rate of 6 l/min. A phase-controlled temperature regulator and programmer controlled the temperature in the boat and the temperature in the boat was measured by mounting a hot junction chromel-alumel thermocouple within a small hole in the boat. The output of the thermocouple and the detector were monitored on a two-pen potentiostatic recorder. A 6° C/min. heating rate was maintained in each experiment after the insertion of the sample in the boat. The threshold temperature at which considerable particulation occurred was taken from the chart produced by the recorder. The occurrence of particulation was detected using a Generator Condition Monitor Detector sold by Environment One Corporation.

The following table gives the results:

| Metal Alkyldithiocarbamate | Aging Condition | Thermoparticulating Temperature Range |
|---|---|---|
| Cadmium Diethyldithiocarbamate | 8 days at 60° C | 159–165° C |
| | 15 days at 80° C | 168–173° C |
| Tellurium Diethyldithiocarbamate | 8 days at 60° C | 157–162° C |
| | 15 days at 80° C | 163–166° C |
| Copper Alkyldithiocarbamate | 8 days at 60° C | 196° C |
| Zinc Diethyldithiocarbamate | 8 days at 60° C | 187–193° C |
| Bismuth Diethyldithiocarbamate | 8 days at 60° C | 196° C |
| Selenium Diethyldithiocarbamate | 8 days at 60° C | 160–209° C |
| | 15 days at 80° C | 161–210° C |
| Zinc Dibutyldithiocarbamate | 8 days at 60° C | 184–190° C |
| Zinc Dimethyldithiocarbamate | 8 days at 60° C | 196–205° C |
| Lead Dimethyldithiocarbamate | 8 days at 60° C | 196° C |

The above table shows that the cadmium, tellurium, zinc, and selenium compounds have the lowest thermoparticulating temperature range, and that the cadmium and zinc compounds are stable at 80° C.

EXAMPLE 2

A composition containing cadmium diethyldithiocarbamate prepared as in Example 1 was brushed onto copper rectangular blocks (4 × 2¼ × 1½ inches). The coating was allowed to dry overnight at 60° to 80° C; total coating build was approximately 10 mils over an area of 31 square inches (end plates not covered).

The block contained two 650 watt heaters drilled into the copper core; the heaters were connected in parallel (two exit leads). The copper block was also equipped with two thermocouples. The block was connected to separate inspection plates in a large generator (four sides of block in hydrogen flow); each block being approximately ½ inch from the outer surface of the generator. The generator was 112 inches in diameter by 245 inches long, 2-poles, 26KV(98) MVA.

In the tests, the coated blocks were externally heated by a source of electrical power. The rate of rise of temperature was controlled to 5° C/minute and the hydrogen was monitored for particulate matter by means of an Environment One Generator Condition Monitor.

The following table gives the results:

| Monitor Alarm Temperature | Time of Run | Monitor Flow (meter) reading | Pressure | Speed | Gas Temperature |
|---|---|---|---|---|---|
| 155 to 165° C | 30 min. | 11.0 | 30 psi | 3600 rpm | 31° C |

We claim:

1. A method of protecting electrical apparatus from damage to overheating and for thereafter determining the locating of said overheating, said apparatus including a gas stream and a monitor for detecting particles in said gas stream and for emitting a signal when said particles are detected comprising:
   A. preparing a composition according to claim 1;
   B. applying said composition to said electrical apparatus at positions exposed to said gas stream;
   C. evaporating the solvent in said solution; and
   D. monitoring said gas stream for the presence of particles therein.

2. A method according to claim 1 including the additional last step of inspecting said apparatus visually for blistered and darkened areas, after a signal has been emitted, to locate the area of overheating.

3. A method according to claim 2 including the additional last steps of collecting a sample of said gas stream after a signal has been emitted, and analyzing said sample.

4. A thermoparticulating coating comprising a solid layer of a cured resinous carrier containing a metal dithiocarbamate.

5. A coating according to claim 4 which is about 1/16 to about ½ inches thick.

6. A thermal detection system for electrical apparatus cooled by a gas stream, comprising a coating according to claim 4 on a portion of said electrical apparatus exposed to said gas stream and a monitor for detecting the presence of particles in said gas stream.

7. A composition comprising at least one metal dithiocarbamate and a solution of a resinous carrier curable and stable at 60° C, and unreactive with said metal dithiocarbamate.

8. A composition according to claim 7 wherein said metal dithiocarbamate has the general formula:

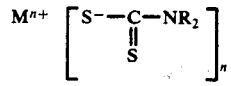

where each R is independently selected from the group consisting of hydrogen, alkyl to $C_{20}$, cycloalkyl to $C_{20}$, aryalkyl to $C_{20}$, aryl, and heterocyclic, M is a Group II or Group VI metal ion, and n is the charge on said ion.

9. A composition according to claim 8 wherein each R is independently selected from alkyl to $C_5$.

10. A composition according to claim 8 wherein M is selected from the group consisting of Cd, Te, Se, and Zn.

11. A composition according to claim 10 wherein M is selected from the group consisting of Zn and Cd.

12. A composition according to claim 7 wherein the amount of said metal dithiocarbamate is about 20 to about 250 phr and the amount of the solvent in said solution is about 25 to about 75% (by weight based on said resinous carrier).

13. A composition according to claim 12 wherein the amount of said metal dithiocarbamate is about 40 to about 60 phr and the amount of said solvent is about 45 to about 55% (by weight based on said resinous carrier).

14. A composition according to claim 7 wherein said resinous carrier is an epoxy resin.

15. A composition according to claim 14 which includes about 0.1 to about 3 phr of a drier for said epoxy resin.

16. A composition according to claim 15 which is prepared by first mixing said solution of resinous carrier and said drier and then mixing in said metal dithiocarbamate 17. A composition according to claim 7 wherein the solvent in said solution is toluene.

18. A composition according to claim 7 wherein said metal dithiocarbamate is dispersed in said solution.

19. A composition according to claim 7 wherein said resinous carrier is air-dryable.

20. A composition according to claim 1 wherein said resinous carrier is curable at room temperature.

* * * * *

UNITED STATES PATENT AND TRADEMARK OFFICE
CERTIFICATE OF CORRECTION

PATENT NO. : 4,056,006
DATED : November 1, 1977
INVENTOR(S) : James D.B. Smith et al.

It is certified that error appears in the above-identified patent and that said Letters Patent is hereby corrected as shown below:

Claim 1, line 7, delete "1" and substitute -- 7 --.

Claim 7, line 1, after "comprising" insert -- about 20 to about 250 phr of --.

Claim 12, delete line 2.

Claim 12, line 3, delete "about 250 phr and the".

Claim 20, line 1, delete "1" and substitute -- 7 --.

Signed and Sealed this

Ninth Day of February, 1988

Attest:

DONALD J. QUIGG

*Attesting Officer*  *Commissioner of Patents and Trademarks*